United States Patent
Nishino et al.

[19]
[11] Patent Number: 5,828,990
[45] Date of Patent: Oct. 27, 1998

[54] ELECTRONIC NEWS TRANSLATING AND DELIVERY APPARATUS

[75] Inventors: Fumihito Nishino; Naomi Sugimoto, both of Kawasaki, Japan

[73] Assignee: Fujitsu Limited, Kawasaki, Japan

[21] Appl. No.: 624,956

[22] Filed: Mar. 25, 1996

Related U.S. Application Data

[63] Continuation of Ser. No. 367,774, Jan. 3, 1995, abandoned, which is a continuation of Ser. No. 91,015, Jul. 14, 1993, abandoned.

[30] Foreign Application Priority Data

Aug. 14, 1992 [JP] Japan .................................. 4-216938

[51] Int. Cl.⁶ .............................................. G06F 17/28
[52] U.S. Cl. ........................................ 704/2; 395/200.76
[58] Field of Search ...................... 395/200.76; 707/102; 704/1, 8, 9, 2, 3, 4, 5, 7

[56] References Cited

U.S. PATENT DOCUMENTS

| | | |
|---|---|---|
| 4,677,552 | 6/1987 | Sibley, Jr. . |
| 4,685,060 | 8/1987 | Yamano et al. . |
| 4,815,030 | 3/1989 | Cross et al. . |
| 4,882,681 | 11/1989 | Brotz . |
| 4,980,829 | 12/1990 | Okajima et al. . |
| 5,077,804 | 12/1991 | Richard . |
| 5,088,038 | 2/1992 | Tanaka et al. . |
| 5,140,522 | 8/1992 | Ito et al. . |
| 5,175,684 | 12/1992 | Chong . |
| 5,268,839 | 12/1993 | Kaji . |
| 5,426,583 | 6/1995 | Uribe-Echebarria Diaz De Mendibil . |

OTHER PUBLICATIONS

Japan Economic Journal, "New Carrier Business in Translation Service", Jan. 31, 1987, p. 19.
Comline Telecommunications, Feb. 14, 1992, "Kodensha Sets Up Japanese–Korean News Translation Service".
Telephone Engineer & Management, Aug. 1, 1991, p. 8, "Hong Kong News".
Don McLagan et al., "Newsedge Integrates Multiple News Wires into Single Personalized News Stream", Business Wire, p. 1, Oct. 17, 1989.
Mike Ricciuti, "MIS goes On line (selecting an on–line information service)", Datamation, pp. 81–83, Jun. 1, 1991.

Primary Examiner—Gail O. Hayes
Assistant Examiner—Alexander Kalinowski
Attorney, Agent, or Firm—Staas & Halsey

[57] ABSTRACT

An electronic news translating and delivery apparatus translates the electronic news received via a network successively, and delivers the translated news to subscribers via another network. Specifically, the apparatus comprises a user manager including a register means to register news groups reserved by user, a translator which translates the articles in the news group registered in the register means of the user manager into a suitable form for the user, a translation manager to manage the translating of the news by the translator, and a delivery manager to deliver the news translated by the translator to registered users.

13 Claims, 8 Drawing Sheets

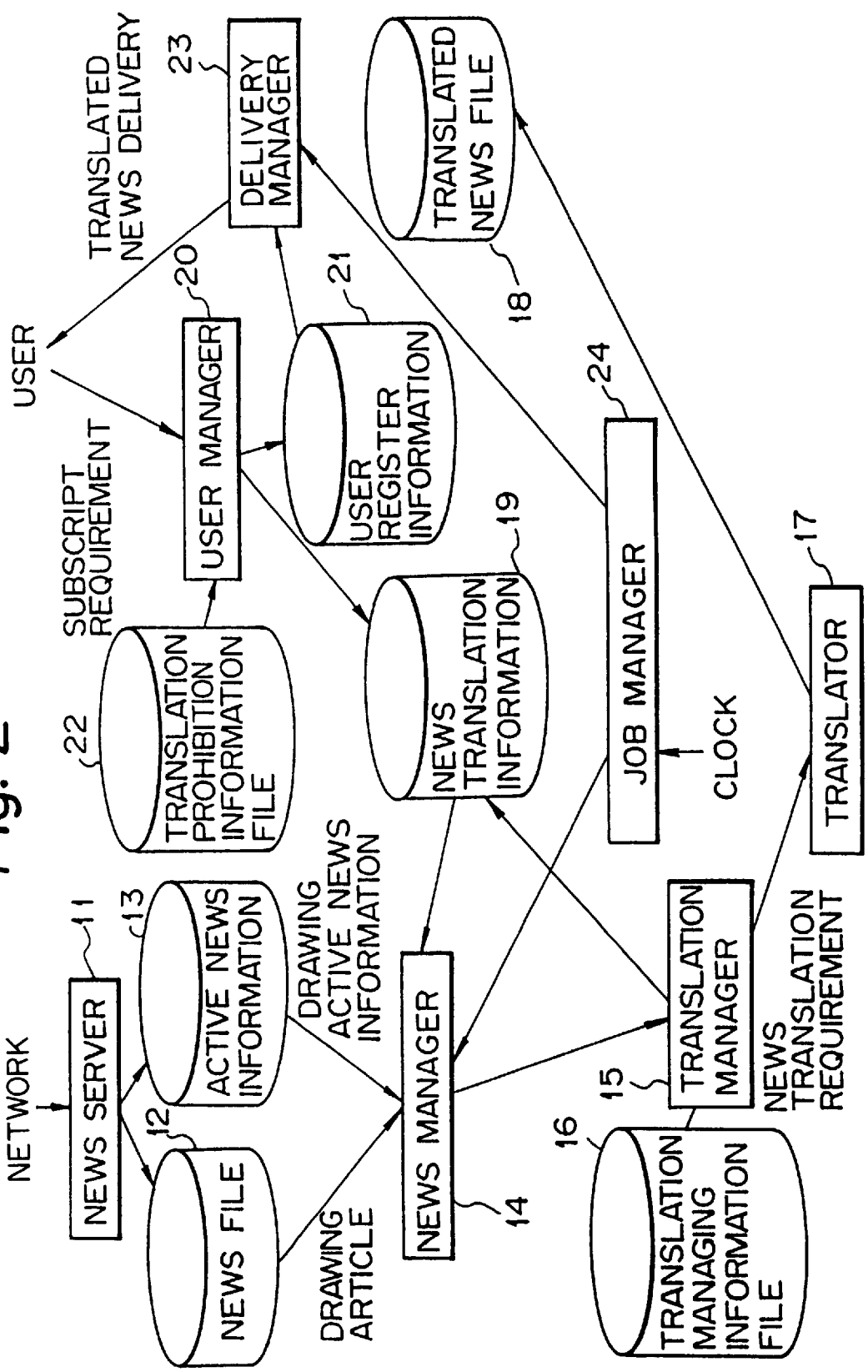

ELECTRONIC NEWS TRANSLATING AND DELIVERY APPARATUS

This application is a continuation of application serial No. 08/367,744, filed Jan. 3, 1995, now abandoned, which is a continuation of application No. 08/091,015, filed Jul. 14, 1993, now abandoned.

BACKGROUND OF THE INVENTION

1. Field of the Invention

The present invention relates to an electronic news translating and delivery apparatus which translates news, received via a network, into Japanese or any suitable language, and delivers the translated news, to subscribers, via another network. More particularly, the present invention relates to an electronic news translating and delivery apparatus which collects the electronic news received via a network, translates the collected electronic news at one time, and, thereafter, delivers the translated news to subscribers via another network.

In the description of the present invention, the word "translation" includes various conversions, for example, making an abstract or converting the text message to a voice message. 2. Description of the Related Art Recently large quantities of news are being delivered to subscribers via networks. These large quantities of news include articles written in foreign languages. Although a foreign language article is classified to one of a number of news groups, a large number of articles can exist in any one group. Therefore, it is difficult to read all of the foreign language articles, even though they are classified into groups.

When subscribers want to read an electronic article written in a foreign language, each subscriber will translate the foreign language article into his/her own language. Since each subscriber translates the article, some articles may be translated many times. It is wasteful that the same articles are translated many times by each subscriber.

By contrast, it would be better for electronic news received via a network to be translated into various languages at one time, and, thereafter, the translated articles to be delivered to each subscriber. This would reduce the load on the translation system.

SUMMARY OF THE INVENTION

It is an object of the present invention to provide an electronic news translating and delivery apparatus, which translates the electronic news received from foreign countries into a suitable form for the subscribers, and which delivers the translated new to subscribers, such that the same article need not be translated many times. Another object of the present invention is to make more efficient use of the translation system to make it easier for subscribers to read the news from foreign countries.

To achieve the above-mentioned objects, the present invention constructs an electronic news translating and delivery apparatus consisting of a user manager, including a register means to register news groups reserved by users, a translator to translate articles in the news group registered in said register means of said user manager into a suitable form for the user, a translation manager to manage the translating of the news at said translator, and a delivery manager to deliver the news translated by said translator to the registered user.

BRIEF DESCRIPTION OF THE DRAWINGS

The above object and features of the present invention will be more apparent from the following description of the preferred embodiment with reference to the accompanying drawings, wherein:

FIG. 2 is a view of the system structure of the embodiment of the present invention;

DESCRIPTION OF THE PREFERRED EMBODIMENTS

Before describing the embodiments of the present invention, the principal of the present invention will be described with reference to the related figure.

Figure 1:
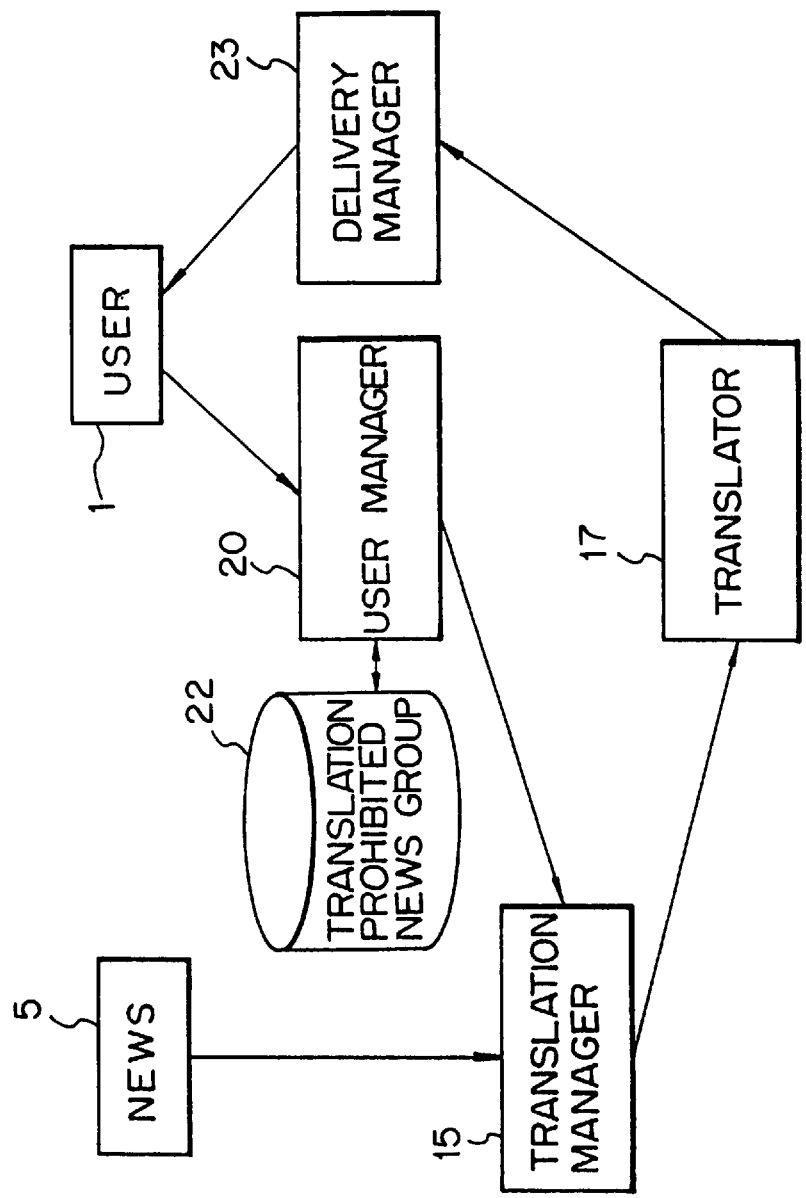
FIG. 1 is a principle block diagram according to the present invention.

FIG. 1 is the principle block diagram according to the present invention. In the figure, an electronic news translating and delivery apparatus is comprised of a user manager 20, including a register means to register news groups reserved by user 1, a translator 17 to translate the articles in the news group registered in the register means of the user manager 20 into a suitable form for user 1, a translation manager 15 to manage translation of the news at the translator 17, and a delivery manager 23 to deliver the news translated by the translator 17 to registered users 1.

The user manager 20 registers the news groups reserved by user 1, and manages the news groups to be translated. When there is an untranslated news item in the received news 5, the translator 17 managed by the translation manager 15 translates translatable portions of the news. The delivery manager 23 delivers the translated and undelivered news to users 1 registered as the subscribers to the news group.

Since the translator 17 translates the received news at one time, users 1 can read the translated news, by previously registering as a member of the news group related to the desired information. Also, since the same news will not be translated many times, the load on the translating system can be reduced.

FIG. 2 is a view of a system structure of an embodiment of the electronic news translating and delivery apparatus of the present invention.

The system structure shown in the FIG. 2 is equipped with an ordinary electronic news delivery system (not shown) which does not have a translation function.

In the figure, a news server 11 receives the news information transmitted via a network, stores the news information in a news file 12, and stores a name of a news group and a number of the news item as active news information into an active news information file 13.

A news manager 14 obtains an active news list from the active news information file 13, and draws out the news from the news file 12.

A translation manager 15 manages the translation of the news sent from the news manager 14. The translation managing information file 16 stores the translation managing information. The translation manager 15 requires the translation of the news according to the translation managing information of the translation managing information file 16, and stores the news translation information into the news translation information file 19.

A translation processor 17 translates the news required to be translated by the translation manager 15, and stores the translated news in the translated news file 18.

A user manager 20 manages the registration of the news delivery and the deletion of the news delivery register referring to the translation prohibition information file 22, and stores the user register information into the user register information file 21.

A delivery manager 23 transmits the translated news stored in the translated news file 18 to user 1 according to the user register information stored in the user register information file 21.

The job manager 24 arranges for predetermined jobs to start at predetermined times.

FIG. 3 to FIG. 6 are flowcharts showing the process of an embodiment of the present invention. The process of the each portion of the electronic news translating and delivery apparatus will be described hereinafter with reference to the related figures.

(1) USER MANAGER

The user manager 20 manages the user managing information established by requests from the user 1, to register the subscription or to cancel the subscription register.

In mail transmitted from a user 1 into the subscription address in the user manager 20, the requirement such as "register", "delete", "information", and "help" are recorded on the subject section in the mail. The user manager 20 executes the process of registration, deletion, information indication, and help concerned with the news group, according to the requirement recorded on said subject section. These processes are executed at the time the mail is received. When an error occurs during the processes being executed, the system staff at the electronic news translating and delivery apparatus is notified.

When a user 1 asks to register a subscription, the user 1 designates "register" in the subject section and the desired news group name in the information section in the user manager 20 at the same time. In this case, the address on the "from" section in the register request mail is used for the destination of the subscription news.

When the subscription register is requested by a user 1, the user manager 20 checks whether each news group requested on the mail information exists in the active news information 13. Additionally, the user manager 20 checks whether each news group corresponds with a news group in the translation prohibition information file 22.

When a news group is written in the user's own language, binary image information, source code of program, and/or other untranslatable items, patterns in their news group name are registered in the translation prohibition information file 22. The user manager 20 checks whether the news group requested by the user is a news group prohibited to the subscription by referring to the translation prohibition information file 22. When the news group is not a prohibited news group, the user manager 20 registers the news group required by user 1 into the user register information file 21.

In order to register the news group required by user, the user manager 20 registers an address (the address on the "from" section in the register requirement mail) of the subscriber into the delivery list file in each news group directory. If the user is the first subscriber for the news group, a directory corresponding to the news group is generated, and the destination list file is generated.

Furthermore, the current maximum id number in the active news information file 13 is incremented, and this id number is written in a newly generated file. The latter id number represents the article id of the next article to be translated. This prevents the occurrence of a large quantity of news articles being translated or delivered. Therefore, the news received in the news server 11 before the registration is not translated, but the news received after the registration is translated.

When a user requests cancellation of the register, the user manager 20 deletes its address of the user from a destination list file in the user register information file 21. If there is no subscriber requiring the delivery of a news group as a result of the deletion, the directory of the news group is deleted. The deleted news group will not be translated in the future.

The above deletion process must wait to start until the delivery manager 23 is delivering the translated news and the lock file exists.

When the user requests an indication of the available information, the user manager 20 also sends the user a list showing news groups subscribed to by the user.

Figure 3A:
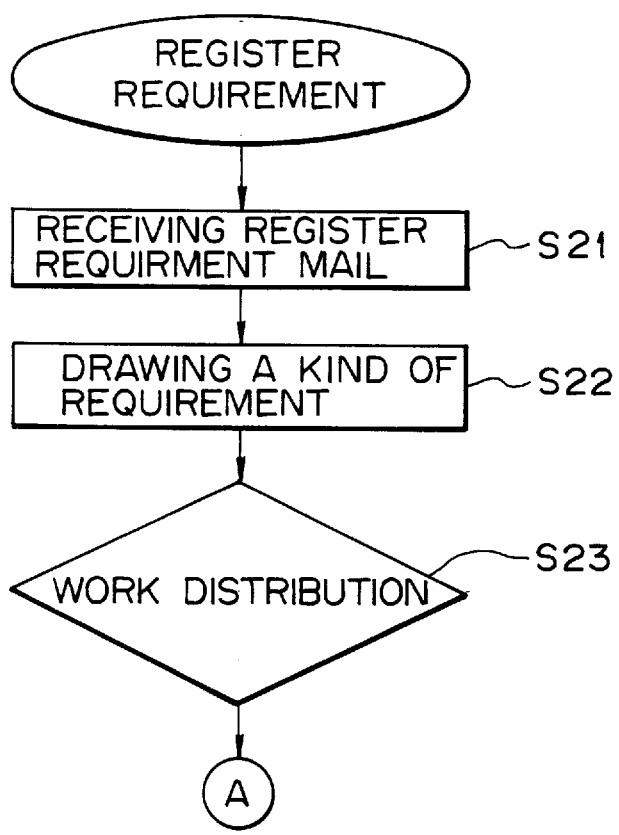
FIGS. 3A, 3B, and 3C, when connected into one flowchart, show the process at the user manager.
Figure 3B:
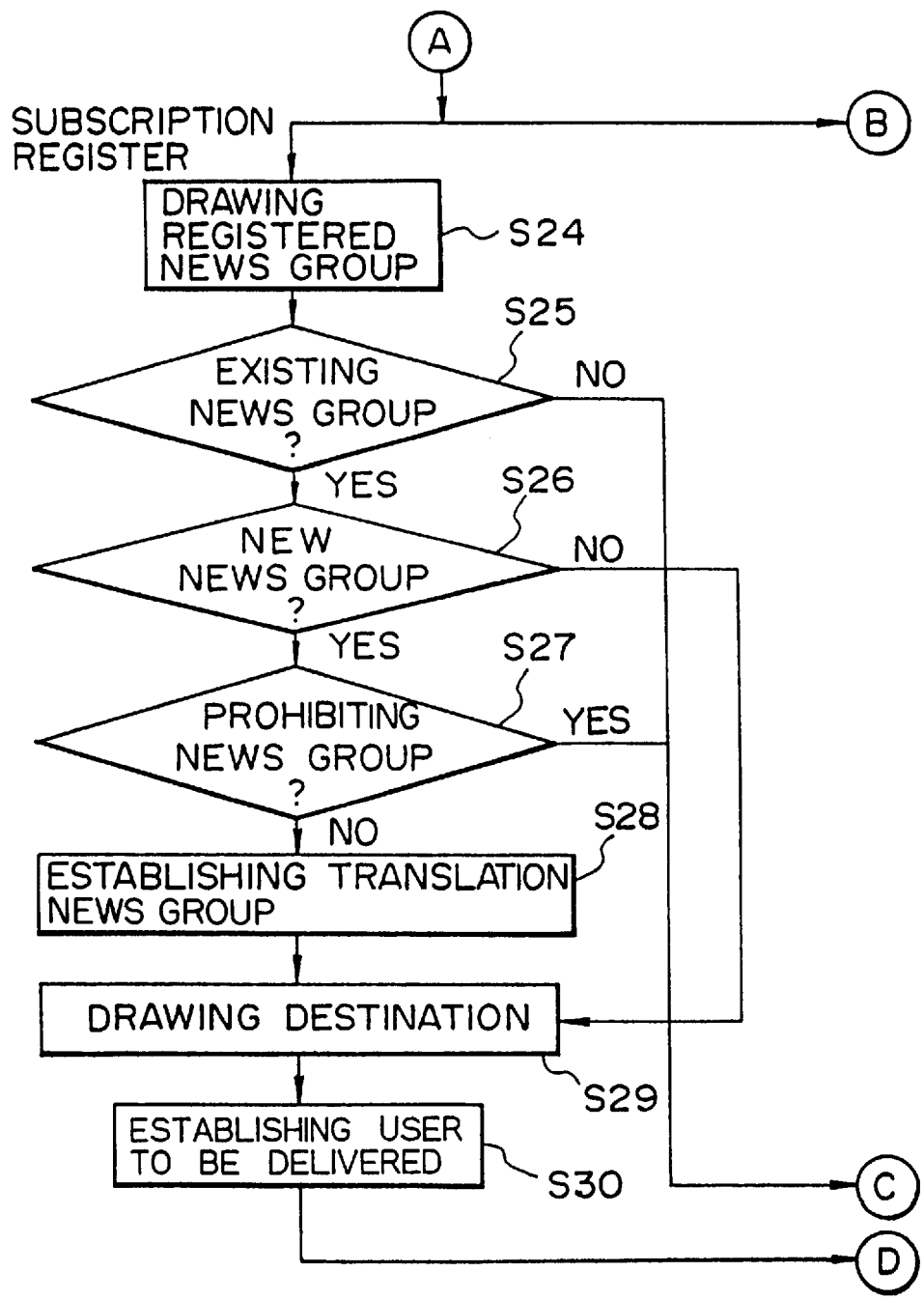
Figure 3C:
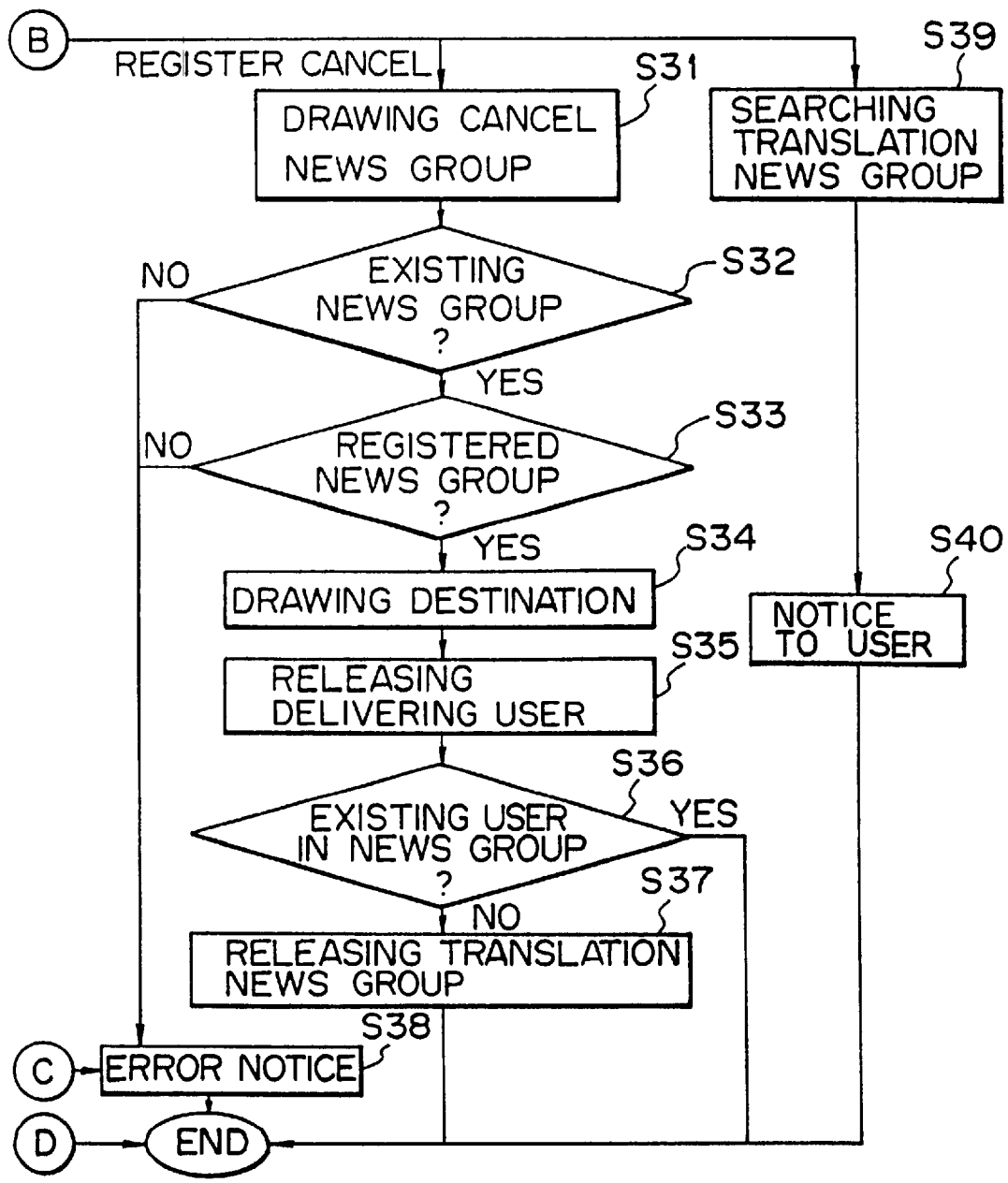

FIGS. 3A, 3B, and 3C, when connected into one flowchart, show the management of the processes of registration, deletion, register information indication, and other processes by the user manager 20. The processes of the embodiment will be described with reference to FIGS. 3A, 3B, and 3C.

In FIG. 3A, the process starts when the user requests registration. In step S21, the user manager 20 receives the register request mail. In step S22, the user manager 20 draws out a type of the requirement. In step S23, the required work is distributed according to the type of requirement.

When the user request is to register a subscription, the registered news group is retrieved in step S24 in FIG. 3B.

In step S25, it is determined whether the requested news group required exists. When the news group does not exist (NO), the system staff is notified of the error in step S38 in FIG. 3C, and the process is ended. When the news group exists (YES), the process goes to step S26. In step S26, it is determined whether the news group is newly reserved. When the news group is not newly reserved (NO), the destination is drawn out, in step S29. When the news group is newly reserved (YES), the process goes to step S27.

In step S27, it is determined whether the news group belongs to the subscription prohibited news group. When the news group belongs to the subscription prohibited news group (YES), the system staff is notified of the error in step S38 in FIG. 3C, and the process is ended. When the news group does not belong to the subscription prohibited news group (NO), the process goes to step S28.

In step S28, the news group to be translated is established. The destination is retrieved in step S29. The user to be delivered the translated articles in the news group is established in step S30. The process is ended in FIG. 3C.

In the above step S23, when the user request is a cancellation of registration, the process goes to step S31 in FIG. 3C.

In step S31, the news group to be cancelled register is retrieved. In step S32, it is determined whether the news group exists. When the news group does not exist (NO), the system staff is notified of the error in step S38, and the process is ended. When the news group exists (YES), the process goes to step S33.

In step S33, it is determined whether the news group belongs to the user's registered news group. When the news group does not belong to the registered news group of the user (NO), the system staff is notified of the error in step S38, and the process is ended.

When the news group belongs to the user's registered news group (YES), the destination is drawn in step S34. The user to be delivered is cancelled in step S35, and the process goes to step S36.

In step S36, it is determined whether an existing user still belongs to the news group. When a user belongs to the new group (YES), the process is ended. When the user does not belong to the news group (NO), the translation news group is cancelled in step S37, and the process is ended.

In the above step S23, when the user request is a register information indication, the registered news group of the user is searched in step S39. The user is notified of the searched news group in step S40, and the process is ended.

(2) JOB MANAGER

The job manager 24 manages a job which retrieves the news, and executes the translation, and a job which delivers the translated news to the user or subscriber.

The job manager 24 prepares a file which has been set up at a predetermined time. The job manager 24 starts said jobs according to the directions in the file.

(3) NEWS MANAGER

The news manager 14 is started according to the direction of the job manager 24, and obtains an active news list from the active news information file which stores the information corresponding to the news group, and retrieves the news from news file 12.

The active news list is stored in the active news information file 13 managed by news server 11. The news manager 14 retrieves the information from the active news list. The information shows what news group exists, and the maximum article id and the minimum article id of the news groups stored in the active news list. The news manager 14 retrieves news items from the news file.

News to be translated enters a news server 11 designated via the network, and is stored into news file 12. The news manager 14 retrieves a news item which agrees with an article id designated under the directory storing the article of the news file 12.

In a UNIX system, each news group has a directory structure separating the news group by name by periods such as "comp. sys. mac". The news articles exist in the file name of each article id under the directories and the designated news is retrieved from under the appropriate directory.

The news manager 14 also draws out the maximum id and the minimum id of the news group stored currently in the active news information file 13, i.e., the news manager 14 obtains the maximum id and the minimum id of the news groups, by retrieving a record having the information concerned with news group names designated by a file managing the electronic news in the active news information file 13, and retrieving a value of a field designated said record.

Figure 4:
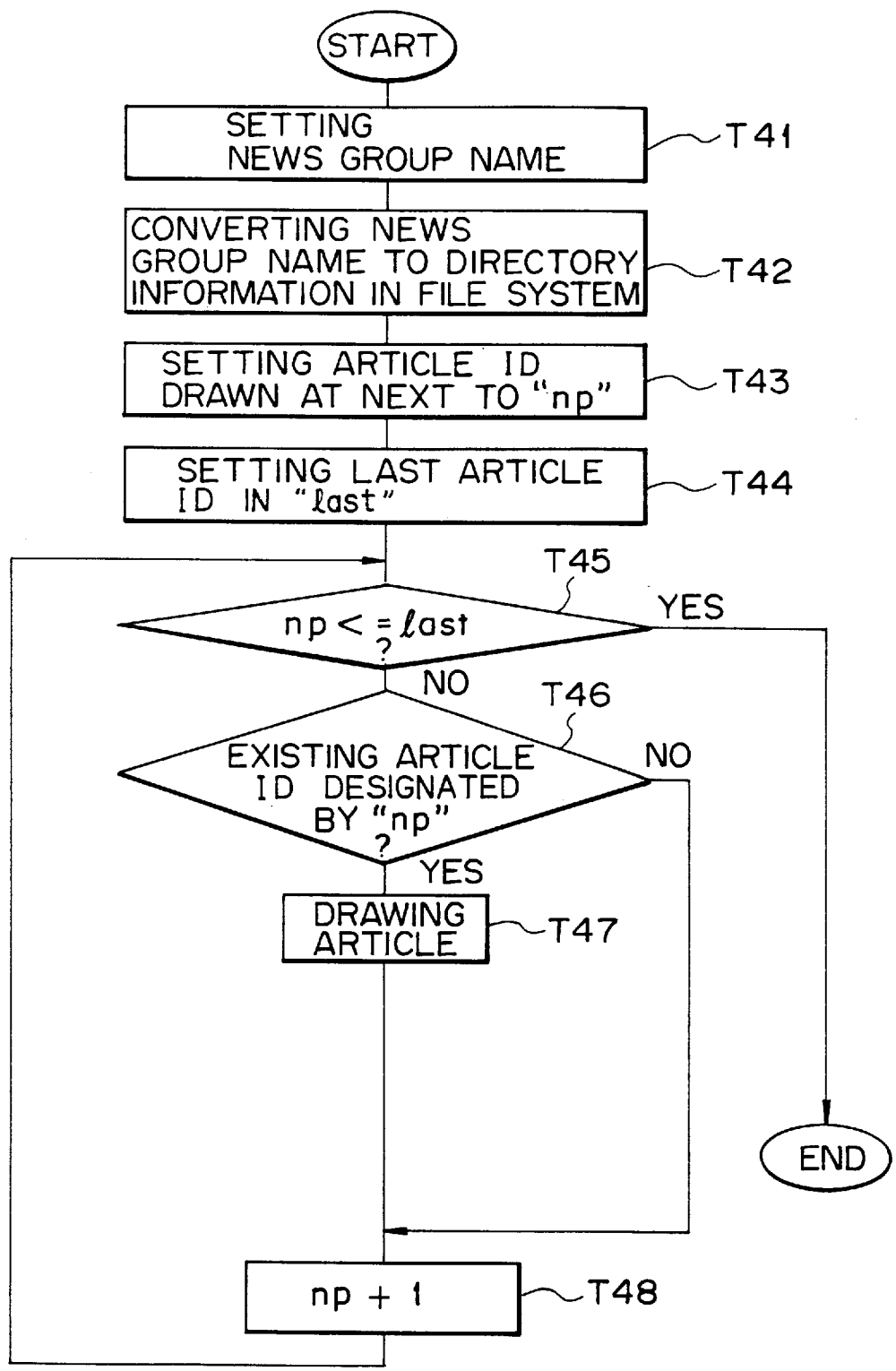
FIG. 4 is a flowchart showing the process at the news manager.

FIG. 4 is a flowchart showing the process of retrieving an article by the news manager 14. The process of drawing an article of the embodiment will now be described with reference to FIG. 4.

A name of a news group is set up in step T41. The name of the news group is converted to directory information on the file system in step T42.

An article id to be retrieved next is set up in "np" in step T43. An article id to be retrieved last is set up in "last" in step T44.

In step T45, it is determined whether "np" is less than "last". When "np" is larger that "last" (NO), the process is ended. When "np" is equal to or less than "last" (YES), the process goes to step T46.

In step T46, it is determined whether an article of the id designated by "np" exists. When the article of designated id does not exist (NO), the process goes to step T48. When the article of the designated id exists (YES), the article is retrieved in step T47, and 1 is added to the value "np" in step T48. The process returns to step T45, and the aforementioned process is repeated.

(4) TRANSLATION MANAGER

The translation manager 15 manages translation control of the news items, and starts at a predetermined time, for example, once a day, under control of the job manager 24.

The news group to be translated has a directory structure which has the same name as the news group name under a directory "$NG". The translation manager 15 searches successively all directories or news groups under the directory "$NG", and translates the article called out according to a value of a file containing the article id to be translated following the news group.

Figure 5:
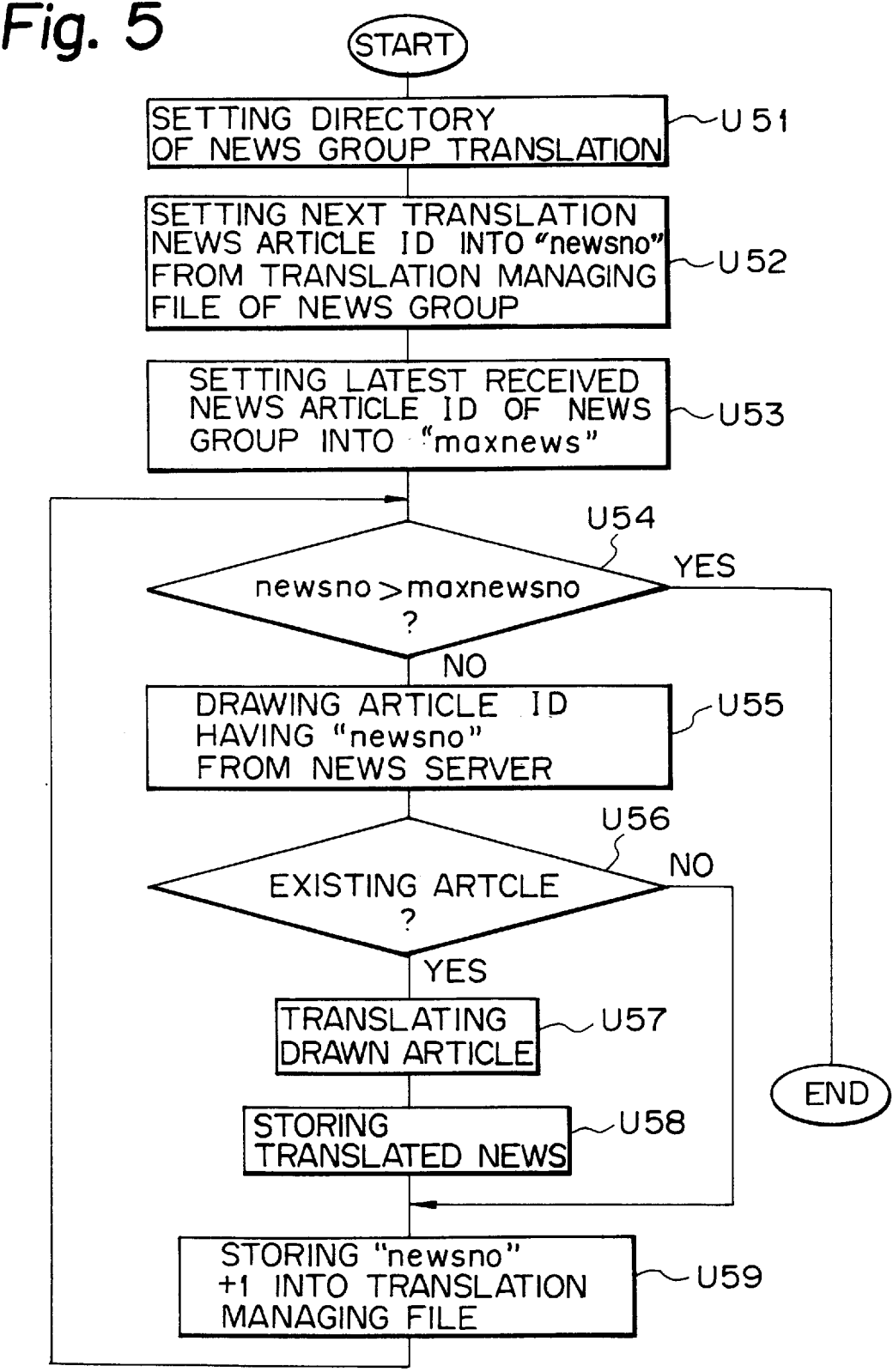
FIG. 5 is a flowchart showing the process at the translation manager.

FIG. 5 is a flowchart showing the process of translation management at the translation manager 15. The process of the translating management of the embodiment will now be described with reference to FIG. 5.

In step U51, a directory of the news group to be translated is set up. In step U52, the news article id to be translated at the next time is retrieved from the translation management information file 16, and the id is set up in "newsno". In step U53, the latest news article id of the received news group is set into "maxnews".

In step U54, it is determined whether "newsno" is larger that "maxnews". When "newsno" is larger than "maxnews" (YES), the process is ended. When "newsno" is not larger than "maxnews" (NO), the process goes to step U55. In step U55, the article having the news article id "newsno" is retrieved.

In step U56, it is determined whether the article having the news article id "newsno" exists. When the article does not exist (NO), the process goes to step U59. When the article does exist (YES), the process goes to step U57.

In step U57, the retrieved article is sent to the translation processor 17, and is translated. In step U58, the translated article is given an extension, for example, ".que", and is stored in the translated news file 18. In step U59, 1 is added to the value "newsno", and "newsno" is stored in the news management information file 16. Then the process returns to step U54, and the above-mentioned process is repeated.

(5) DELIVERY MANAGER

The delivery manager 23 delivers the translated news to the subscriber, and is started under control of the job manager 24.

A translated file is stored under each translation news group directory, and is managed as a file affixed with a flag indicating an untransmitted news item (for example, a file name is affixed with an extension ".que" as aforementioned).

The delivery manager 23 transmits these translated and untransmitted news items to the user registered in the user register information file 21 by electronic mail. When the user is not registered in the register information file 21, the system staff is notified of the error. The news group name and the contents described in the original news are described in the "Subject" section of the electronic mail.

When the news is transmitted properly, the extension is removed from the news, so that the news item file name becomes only the numeric file name. When the news transmission fails, the extension is removed from the news, and an extension ".fail", is affixed to the news. After that, the system staff is notified of the failure.

As the news is transmitted, a wait is inserted between each mail transmission of each news group to prevent a file overflow of the mail transmission machine due to a large number of mail transmissions.

Therefore, the deletion process of the news group directory cannot be performed according to a register deletion requirement by a user, and a lock file is created in advance of the processing of each directory. The lock file is deleted after the process is completed or interrupted.

Figure 6:
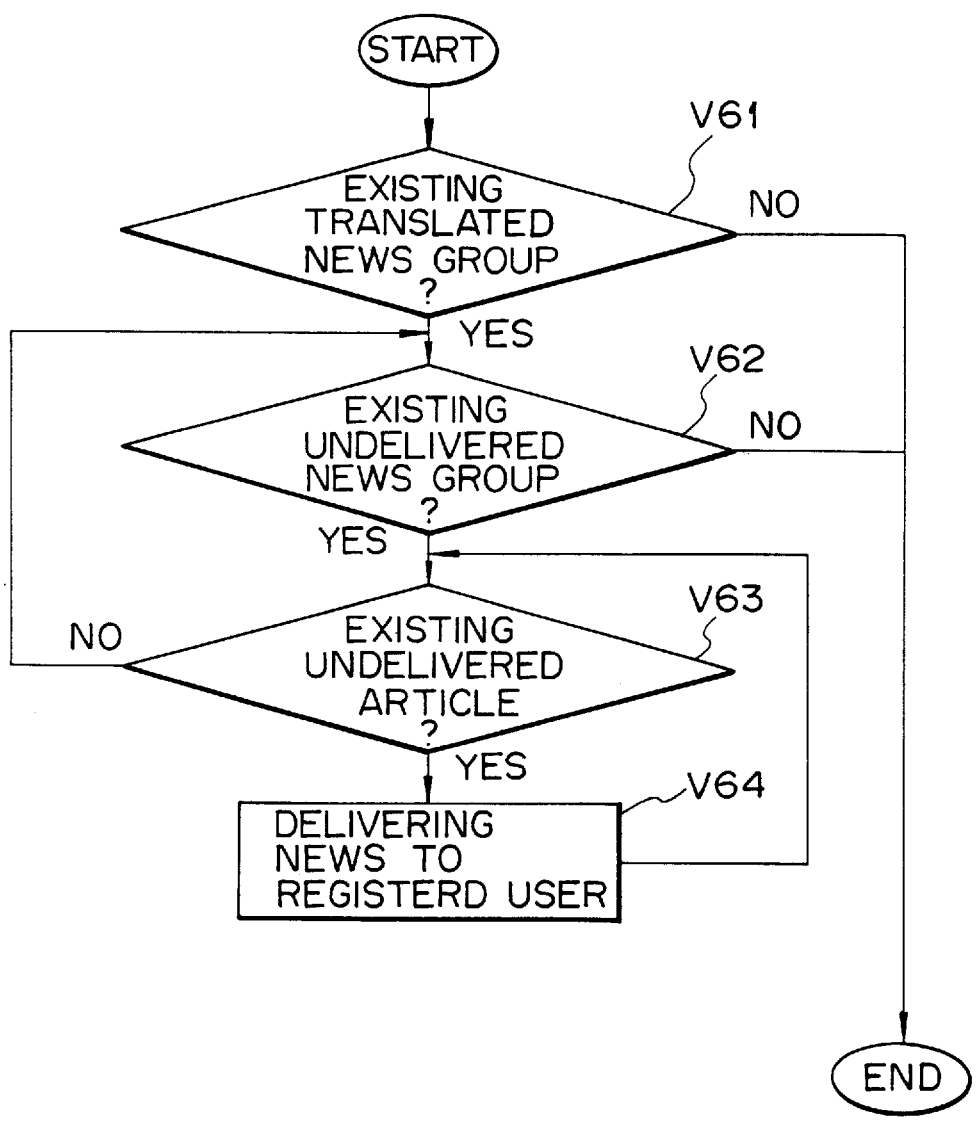
FIG. 6 is a flowchart showing the process at the delivery manager.

FIG. 6 is a flowchart showing the delivery process of the delivery manager 23. The delivery process of the embodiment will now be described with reference to FIG. 6.

In step V61, it is determined whether the registered news group exists. When the news group does not exist (NO), the process is ended. When the news group does exist (YES), the process goes to step V62.

In step V62, it is determined whether the undelivered news group exists. When the undelivered news group does not exist (NO), the process is ended. When the undelivered news group does exist (YES), the process goes to step V63.

In step V63, it is determined whether undelivered news does exist. When the undelivered news does not exist (NO), the process returns to step V62. When the undelivered news does exist (YES), the undelivered news is delivered to a user in step V64. The process returns to step V63, and the above-mentioned process is repeated.

(6) TRANSLATION PROCESSOR

The translation processor 17 retrieves the body of the article and executes the translation of the article.

The electronic article is constructed of a header, a body, and a signature as shown below.

TABLE 1

| From: | name | |
|---|---|---|
| Date: | 10 Jun 1992 | . . . header |
| Newsgroups:comp.sys | | |
| (blank line) | | |
| Body | | . . . a body |
| (blank line) | | |
| Nishino@Fujitsu | | . . . a signature |

The translation processor 17 analyzes and understands the construction of the electronic article. It then retrieves the body of the article according to the document definition, for example, "a part of the article from head to a blank line is a header". The retrieved body is sent to the translation processor.

During the translation process of a document, the document is translated according to the document structure, the document cutting out, the cord conversion, the pretreatment of a citation process, a translation call, and a postprocessing of the document. The translated article is stored in the translated news file 18.

ADVANTAGEOUS EFFECT OF THE INVENTION

As described before, according to the present invention, the user manager registers the news group required by a user, and translates the articles of a registered news group to a form suitable for the user, and delivers the translated news to the registered user. Therefore, the subscriber can read the translated electronic news by previously registering the group or keyword related to the desired information. As the same articles are not translated many times, the load on the translation system can be reduced.

We claim:

1. An electronic news translating and delivery apparatus for translating news received via a first network and delivering translated news to a plurality of users via a second network, said electronic news translating and delivery apparatus comprising:

a job manager that manages a starting timing of a translating job and a delivery job;

a news server that classifies articles contained in the electronic news, received via the first network, into a plurality of news groups and stores the articles based on the classifications;

a translator that translates the articles into a preselected form;

a translation manager, started by said job manager, which transfers articles in news groups of the plurality of news groups which require translation to said translator;

a user manager that manages registration and cancellation of the plurality of users and registration and cancellation of the plurality of news groups to which the user subscribes, identifies a news group as a news group requiring translation when a registered user requests a subscription to a previously unsubscribed news group and deletes a news group to which no registered user subscribes and cancels translations thereof, wherein said user manager creates a directory corresponding to each of the news groups, and creates a destination list file for each of the news groups, when a user is the first subscriber to the news group; and a delivery manager, started by said job manager, that delivers the articles in the news group translated by said translator and subscribed to by the plurality of users to the appropriate users via the second network.

2. An electronic news translating and delivery apparatus according to claim 1, wherein:

said articles have article numbers, each article being assigned an article number, one of said articles have a highest value of the article numbers; and said user manager creates a file containing the article number of an article to be translated next and registers an initial value wherein an initial value is the highest value of the article numbers plus one.

3. An electronic news translating and delivery apparatus for use by a plurality of registered users, for translating and delivering news, said electronic news translating and delivery apparatus comprising:

a user manager which registers news groups reserved by each of said plurality of registered users, each news group comprising articles, and manages the news groups to be translated;

a translator which translates the articles into a preselected form;

a translation manager which manages said translator to translate said articles registered by said user manager;

a delivery manager which delivers the articles translated by said translator to registered users; and said translation manager causing the translator to translate the articles based on information stored in a translation managing information file which contains information for controlling which articles and in which sequence the articles are to be provided to said translator.

4. An electronic news translating and deliver apparatus according to claim 3, wherein:
said translator only translates the translatable portion of each article when all of the article or a part of the article cannot be translated.

5. An electronic news translating and delivery apparatus according to claim 3, wherein:
said user manager creates a directory corresponding to each of the news groups, and creates a destination list file for each of the news groups, when a user is the first subscriber to the news group.

6. An electronic news translating and delivery apparatus according to claim 3, wherein:
said articles have article numbers, each article being assigned an article number, one of said articles have a highest value of the article numbers; and
wherein said user manager creates a file containing the article number of an article to be translated next and registers an initial value wherein an initial value is the highest value of the article numbers plus one.

7. An electronic news translating and delivery apparatus according to claim 3, further comprising:
a translation prohibition news group file that registers news prohibited from being translated by the user manager, wherein said user manager rejects registration of a news group to a registered user when the registered user requests a subscription to a news group which is recorded in said translation prohibition news group file.

8. An electronic news translating and delivery apparatus according to claim 3, wherein:
said translator analyzes a document structure of each article, said document structure including at least one of a citation, a header, and a signature, and translates the article according to said document structure.

9. An electronic news translating and delivery apparatus according to claim 3, wherein:
said delivery manager delivers the news when traffic on the second network is at a level which ensures the translated news can be delivered reliably.

10. An electronic news translating and delivery apparatus for translating news received via a first network and delivering translated news to a plurality of users via a second network, said electronic news translating and delivery apparatus comprising:
a job manager that manages a starting timing of a translating job and a delivery job;
a news server that classifies articles contained in the electronic news, received via the first network, into a plurality of news groups and stores the articles based on the classifications;
a translator that translates the articles into a preselected form;
a translation manager, started by said job manager, which transfers articles in news groups of the plurality of news groups which require translation to said translator;
a user manager that manages registration and cancellation of the plurality of users and registration and cancellation of the plurality of news groups to which the user subscribes, identifies a news group as a news group requiring translation when a registered user requests a subscription to a previously unsubscribed news group and deletes a news group to which no registered user subscribes and cancels translations thereof;
a delivery manager, started by said job manager, that delivers the articles in the news group translated by said translator and subscribed to by the plurality of users to the appropriate users via the second network; and
a translation prohibition news group file that registers news prohibited from being translated by the user manager, wherein said user manager rejects registration of a news group to a registered user when the registered user requests a subscription to a news group which is recorded in said translation prohibition news group file.

11. An electronic news translating and delivery apparatus for translating news received via a first network and delivering translated news to a plurality of users via a second network, said electronic news translating and delivery apparatus comprising:
a job manager that manages a starting timing of a translating job and a delivery job;
a news server that classifies articles contained in the electronic news, received via the first network, into a plurality of news groups and stores the articles based on the classifications;
a translator that analyzes a document structure of an article, including at least one of a citation, a header, and a signature, and translates the article according to the document structure into a preselected form;
a translation manager, started by said job manager, that transfers articles in news groups of the plurality of news groups which require translation to said translator;
a user manager that manages registration and cancellation of the plurality of users and registration and cancellation of the plurality of news groups to which the user subscribes, identifies a news group as a news group requiring translation when a registered user requests a subscription to a previously unsubscribed news group and deletes a news group to which no registered user subscribes and cancels translations thereof; and
a delivery manager, started by said job manager, that delivers the articles in the news group translated by said translator and subscribed to by the plurality of users to the appropriate users via the second network.

12. An electronic news translating and delivery apparatus for translating news received via a first network and delivering translated news to a plurality of users via a second network, said electronic news translating and delivery apparatus comprising:
a job manager that manages a starting timing of a translating job and a delivery job;
a news server that classifies articles contained in the electronic news, received via the first network, into a plurality of news groups and stores the articles based on the classifications;
a translator that translates the articles into a preselected form;
a translation manager, started by said job manager, that transfers articles in news groups of the plurality of news groups which require translation to said translator;
a user manager that manages registration and cancellation of the plurality of users and registration and cancellation of the plurality of news groups to which the user subscribes, identifies a news group as a news group requiring translation when a registered user requests a subscription to a previously unsubscribed news group and deletes a news group to which no registered user subscribes and cancels translations thereof; and a delivery manager, started by said job manager, that delivers the articles in the news group translated by said translator and subscribed to by the plurality of users to the appropriate users via the second network, said delivery manager delivers the news when traffic on the second network is at a level which ensures the translated news can be delivered reliably.

13. An electronic news translating and delivery apparatus for translating news received via a first network and delivering translated news to a plurality of users via a second network, said electronic news translating and delivery apparatus comprising:

a job manager that manages a starting timing of a translating job and a delivery job;

a news server that classifies articles contained in the electronic news, received via the first network, into a plurality of news groups and stores the articles based on the classifications;

a translator that translates the articles into a preselected form;

a translation manager, started by said job manager, that transfers articles in news groups of the plurality of news groups which require translation to said translator, said translation manager causes the translator to translate the articles based on information stored in a translation managing information file containing information for controlling which articles are to be provided to said translator and the sequence the articles are to be provided to said translator;

a user manager that manages registration and cancellation of the plurality of users and registration and cancellation of the plurality of news groups to which the user subscribes, identifies a news group as a news group requiring translation when a registered user requests a subscription to a previously unsubscribed news group and deletes a news group to which no registered user subscribes and cancels translations thereof; and a delivery manager, started by said job manager, that delivers the articles in the news group translated by said translator and subscribed to by the plurality of users to the appropriate users via the second network.

* * * * *

UNITED STATES PATENT AND TRADEMARK OFFICE
CERTIFICATE OF CORRECTION

PATENT NO.: 5,828,990
DATED : October 27, 1999
INVENTOR(S): Fumihito NISHINO et al.

It is certified that error appears in the above-identified patent and that said Letters Patent is hereby corrected as shown below:

Col. 1, line 23, begin a new paragraph with "2. Description".

Col. 4, line 40, begin a new paragraph with "In".

Col. 9, line 25, begin a new paragraph with "wherein".

Signed and Sealed this

Eleventh Day of May, 1999

Attest:

Q. TODD DICKINSON

Attesting Officer

Acting Commissioner of Patents and Trademarks